United States Patent
Uchiyama

[11] Patent Number: 5,858,520
[45] Date of Patent: Jan. 12, 1999

[54] MAGNETIC RECORDING MEDIUM

[75] Inventor: Hiroshi Uchiyama, Miyagi, Japan

[73] Assignee: Sony Corporation, Tokyo, Japan

[21] Appl. No.: 776,256

[22] PCT Filed: May 23, 1996

[86] PCT No.: PCT/JP96/01372

§ 371 Date: Jan. 21, 1997

§ 102(e) Date: Jan. 21, 1997

[87] PCT Pub. No.: WO96/37886

PCT Pub. Date: Nov. 28, 1996

[30] Foreign Application Priority Data

May 24, 1995 [JP] Japan ..................................... 7-124973

[51] Int. Cl.⁶ ...................................................... G11B 5/72
[52] U.S. Cl. ................... 428/216; 428/336; 428/408; 428/421; 428/422; 428/457; 428/694 TC; 428/694 TF; 428/694 TB; 428/900
[58] Field of Search .................... 428/216, 336, 428/408, 421, 422, 457, 694 TC, 694 TF, 694 TB, 900

[56] References Cited

U.S. PATENT DOCUMENTS 5,045,165  9/1991  Yamashita ........................ 204/192.16
5,182,132  1/1993  Murai et al. ............................ 427/577
5,612,134  3/1997  Okita et al. ............................ 428/336
5,637,373  6/1997  Hayashi ................................ 428/65.3

FOREIGN PATENT DOCUMENTS 63-251914 A  10/1988  Japan .
1-205718 A    8/1989  Japan .
4-49520 A     2/1992  Japan .
4-57213 A     2/1992  Japan .
8-161724 A    6/1996  Japan .
8-161726 A    6/1996  Japan .

*Primary Examiner*—Stevan A. Resan
*Attorney, Agent, or Firm*—Hill & Simpson

[57] ABSTRACT

In a magnetic recording medium according to the present invention, a magnetic layer consisting of a metal magnetic material is formed on the upper surface of a non-magnetic support member, a protective layer is formed on the magnetic layer, and a back-coat layer is formed on the rear surface of the non-magnetic support member. In the present invention, in particular, the protective layer is formed by a thin film containing carbon as a main component and 5 to 20 atom % of hydrogen, and the back-coat layer is formed by a thin film containing carbon as a main component and 5 to 20 atom % of hydrogen, thereby making it possible to obtain a magnetic recording medium having excellent sliding characteristics and excellent durability.

2 Claims, 4 Drawing Sheets

MAGNETIC RECORDING MEDIUM

FIELD OF THE INVENTION

The present invention relates to a magnetic recording medium in which a ferromagnetic metal thin film and a protective layer are formed on one major surface of a non-magnetic support member, and a back-coat layer is formed on the other major surface.

BACKGROUND ART

In a magnetic recording medium used in a conventional video tape recorder (to be referred to as a "VTR" hereinafter) or the like, a magnetic layer is formed on one major surface (to be referred to as a "front surface" hereinafter) of a film-like non-magnetic support member, a protective layer is formed on the magnetic layer to protect it, and a back-coat layer for improving the characteristics of the magnetic recording medium is formed on the other major surface (to be referred to as a "rear surface" hereinafter) of the film-like non-magnetic support member.

As such a magnetic recording medium, a so-called coating type magnetic recording medium in which a magnetic coating material including a magnetic powdery material dispersed in a binder is coated on a film-like non-magnetic support member and then dried to form a magnetic layer is popularly used. In the coating type magnetic recording medium, the protective layer or the back-coat layer is formed in the same manner as that of the magnetic layer. More specifically, the protective layer or the back-coat layer is formed in such a manner that a protective layer material or a back-coat layer material including carbon dispersed in a binder is coated on a non-magnetic member and then dried. At this time, the back-coat layer is generally coated with or includes a lubricant containing a fatty acid as a main component.

In contrast to this, with a demand of high-density magnetic recording, a so-called deposition type magnetic recording medium in which a magnetic layer is formed by depositing a ferromagnetic metal material on a non-magnetic support member has attracted attention.

Such a deposition type magnetic recording medium has the following various advantages. That is, loss of a thickness in a recording/reproducing operation can be considerably decreased because the thickness of a magnetic layer in which saturation magnetization can be increased with respect to the anti-magnetic force of the magnetic layer can be remarkably decreased, and a filling density of a magnetic material can be increased because binder serving a non-magnetic material is not mixed in the magnetic layer.

As such a deposition type magnetic recording medium, the magnetic tape in which a $Co_{80}Ni_{20}$ alloy is deposited on a film to form a magnetic layer was merchandized in 1989.

In the deposition type magnetic recording medium, as in a coating type magnetic recording medium, a back-coat layer is formed in such a manner that a back-coat layer material obtained by dispersing carbon or the like in a binder is coated on a non-magnetic support member and then dried.

However, in the deposition type magnetic recording medium, since the magnetic layer consists of a ferromagnetic metal material, when the back-coat layer is formed in a conventional manner, the following problem is posed.

That is, in the coating type magnetic recording medium, a lubricant containing a fatty acid as a main component is coated on or included in the back-coat layer to decrease a friction coefficient of the back-coat layer as described above.

However, in the deposition type magnetic recording medium having the magnetic layer consisting of a ferromagnetic metal material, when a lubricant containing a fatty acid as a main component is coated on or included in the back-coat layer, the lubricant containing the fatty acid as a main component grows the rust of the ferromagnetic recording medium.

Therefore, in the deposition type magnetic recording medium, the back-coat layer cannot be coated with a lubricant containing a fatty acid as a main component, and cannot include the lubricant. For this reason, the deposition type magnetic recording medium has the following problem to be solved. That is, the friction coefficient of the back-coat layer is decreased without coating or including the lubricant containing a fatty acid as a main component on/in the back-coat layer.

A method of increasing the surface roughness Ra of the back-coat layer to degrading the surface properties may be considered to decrease the friction coefficient of the back-coat layer. When the surface properties of the back-coat layer are degraded, and a tape-like magnetic recording medium is wound, the surface properties of the magnetic layer are also degraded depending on the unevenness of the back-coat layer. In this manner, when the surface properties of the back-coat layer is degraded, the surface properties of the magnetic layer are also degraded due to an influence of the back-coat layer, and degradation of characteristics in a recording/reproducing operation or an increase in dropout is caused. Therefore, the method of degrading the surface properties of the back-coat layer to decrease the friction coefficient of the back-coat layer has the above problem.

In the deposition type magnetic recording medium, the friction coefficient of the back-coat layer must be decreased without coating or including a lubricant containing a fatty acid as a main component on/in the back-coat layer and without degrading the surface properties of the back-coat layer.

In the deposition type magnetic recording medium, the type of a binder used in formation of the back-coat layer is limited. More specifically, for example, a vinyl-chloride-based binder cannot be used because chlorine causes a ferromagnetic metal material to rust. For this reason, in the deposition type magnetic recording medium, since the type of the binder used in formation of a back-coat layer is limited, the appropriate composition of the binder cannot be easily founded.

In the deposition type magnetic recording medium, adhering forces among the magnetic layer, the protective layer, and the back-coat layer considerably change depending on the combination among the material of the magnetic layer, the material of the protective layer, and the material of the back-coat layer. For this reason, these materials must be appropriately determined. If these materials are not appropriately selected, for example, a back-coat layer may be partially peeled, or the back-coat layer may be separated from the support member in a width direction or a traveling direction to loss conductivity. Therefore, the back-coat layer may loss the effects of the back-coat layer.

The present invention has been made in consideration of the above conventional circumstances, and has as its object to mainly improve a protective layer and a back-coat layer of a deposition type magnetic recording medium to prevent the deposition type magnetic recording medium from rust and improving the traveling and still characteristics of the deposition type magnetic recording medium.

SUMMARY OF THE INVENTION

In order to achieve the above object, according to the present invention, there is provided a magnetic recording medium in which a ferromagnetic metal thin film is formed on one major surface of a non-magnetic support member, a protective layer is formed on the ferromagnetic metal thin film, and a back-coat layer is formed on the other major surface of the non-magnetic support member, characterized in that the protective layer contains carbon as a main component and 5 to 20 atom % of hydrogen, and the back-coat layer contains carbon as a main component and 5 to 20 atom % of hydrogen.

In the magnetic recording medium, the protective layer contains carbon as a main component and 5 to 20 atom % of hydrogen, and the back-coat layer contains carbon as a main component and 5 to 20 atom % of hydrogen. For this reason, friction between the back-coat layer and the protective layer decreases.

In the magnetic recording medium, the protective layer and the back-coat layer are preferably formed by a plasma CVD method.

When the protective layer and the back-coat layer are formed by the plasma CVD method, the forming rates of the protective layer and the back-coat layer can be increased. For this reason, productivity can be improved. In addition, when the protective layer and the back-coat layer are formed by the plasma CVD method, no binder is required in formation of the protective layer and the back-coat layer. Therefore, when the protective layer and the back-coat layer are to be formed, an appropriate composition of the binder need not be found.

In the magnetic recording medium, the thickness of the protective layer preferably falls within the range of 2 to 20 nm, and the thickness of the back-coat layer preferably falls within the range of 5 to 500 nm.

In this manner, the thickness of the protective layer is set to be 2 nm or more, the durability of the magnetic tape can be improved. However, when the thickness of the protective layer is excessively large, an output is attenuated. For this reason, the thickness of the protective layer is preferably set to be 20 nm or less. More specifically, as described above, when the thickness of the protective layer is set within the range of 2 to 20 nm, a magnetic recording medium having both excellent durability and high output can be obtained.

In the magnetic recording medium, a fluorine-based lubricant is preferably coated on at least one of the protective layer and the back-coat layer. As the fluorine-based lubricant, for example, perfluoropolyether, an ester (e.g., $C_{18}H_{35}COO$—$CH_2$—$CF_2O$—$(C_2F_{40})_m$—$(CF_2O)_n$—$CH_2$—$COOC_{18}H_{35}$) between a carbonic acid and perfluoropolyether, and ester of perfluoroalkylcarboxylate, perfluoroalkylester carboxylate, perfluoroalkylester perfluoroalkylcarboxylate, perfluoroalkylamide carboxylate, or perfluoroalkylamide perfluoroalkylcarboxylate, or a derivative thereof can be used.

In this manner, a fluorine-based lubricant is coated on the protective layer or the back-coat layer, the friction coefficient of the protective layer or the back-coat layer decreases, and further improvement on sliding characteristics of the magnetic recording medium can be achieved.

DETAILED DESCRIPTION OF THE PRESENTLY PREFERRED EMBODIMENTS

An embodiment to which the present invention is applied will be described below with reference to the accompanying drawings. As a matter of course, the present invention is not limited to the above embodiment.

Figure 1:
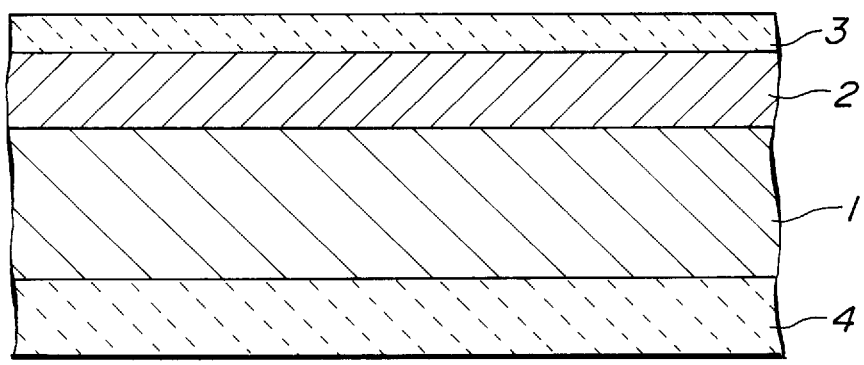
FIG. 1 is a sectional view showing a main part of a magnetic recording medium to which the present invention is applied.

A magnetic recording medium according to this embodiment is a magnetic tape used in an 8-mm VTR. As shown in FIG. 1, in the magnetic recording medium, a magnetic layer 2 is formed on the front surface of a film-like non-magnetic support member 1, a protective layer 3 is formed on the magnetic layer 2, and a back-coat layer 4 is formed on the rear surface of the non-magnetic support member 1.

In the magnetic tape, the magnetic layer 2 is formed in such a manner that a ferromagnetic metal material containing Co as a main component is deposited on the front surface of the non-magnetic support member 1. The protective layer 3 and the back-coat layer 4 are formed by a plasma CVD apparatus.

In this case, the respective thin-film layers formed on the non-magnetic support member 1 are formed in the order of the back-coat layer 4, the magnetic layer 2, and the protective layer 3. When the back-coat layer 4 is formed before the magnetic layer 2 is formed, the back-coat layer 4 is peeled by heat or the like generated in deposition of the magnetic layer 2 because the adhering force of the back-coat layer 4 is weak, or some portions of the non-magnetic support member 1 are extremely contracted due to heat. As a result, the surface of the back-coat layer 4 disadvantageously becomes coarse.

However, as in this embodiment, since the back-coat layer 4 formed by the plasma CVD apparatus has a strong adhering force, no problem is posed by heat or the like generated when the magnetic layer 2 is deposited. For this reason, in this embodiment, the back-coat layer 4 can be formed before the magnetic layer 2 is formed. Since the layers are formed in the above order, static electricity generated when the magnetic layer 2 is deposited is rapidly removed by the back-coat layer 4 which has been formed. As a result, a magnetic tape having preferable characteristics can be obtained.

A deposition apparatus used in formation of the magnetic layer 2 will be described below.

Figure 2:
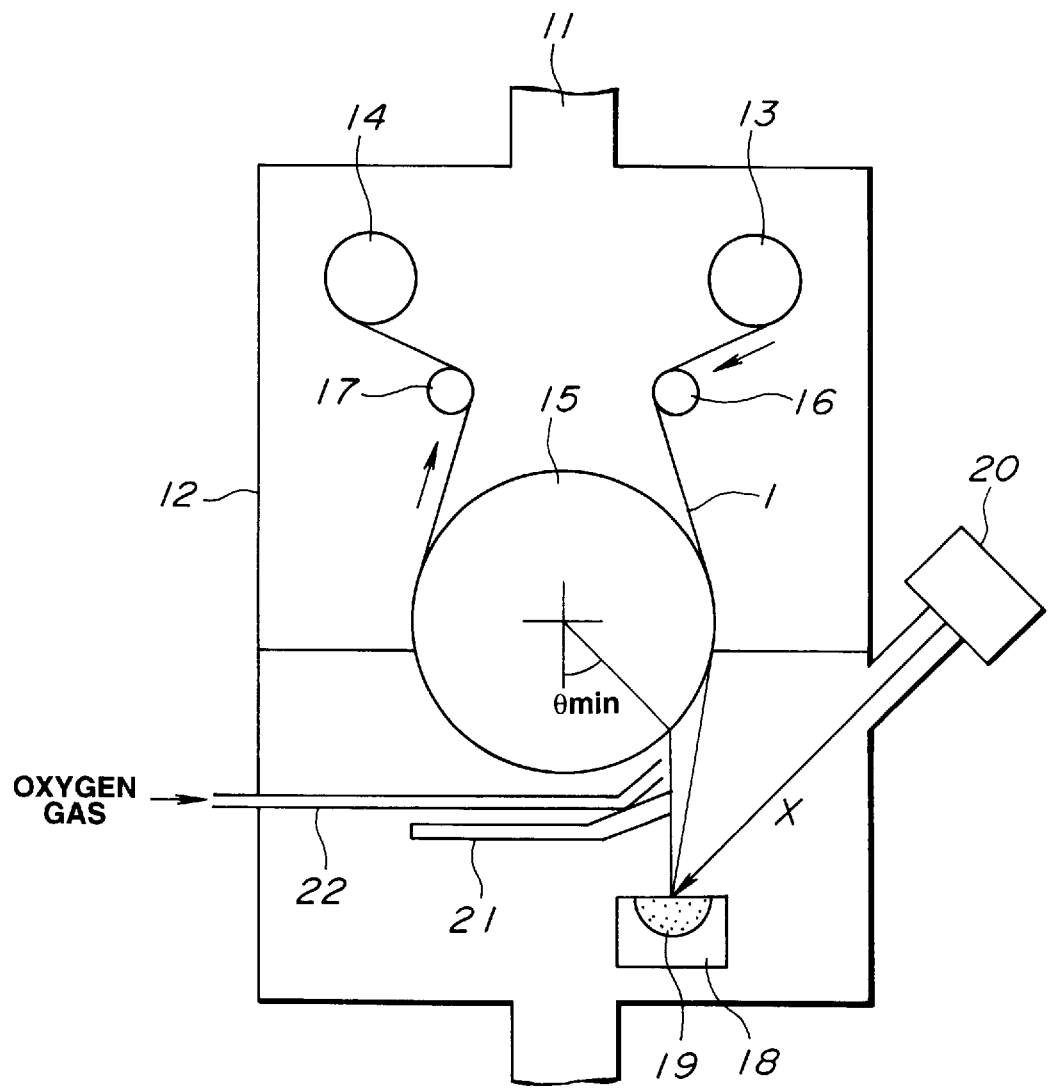
FIG. 2 is a typical view showing an arrangement of a deposition apparatus.

In this deposition apparatus, as shown in FIG. 2, a feeding roll 13 rotated at a predetermined rate clockwise in FIG. 2 and a winding roll 14 rotated at a predetermined rate clockwise in FIG. 2 are arranged in a vacuum chamber 12 evacuated from exhaust ports 11 formed in the head and bottom portions of the vacuum chamber 12. The tape-like non-magnetic support member 1 sequentially travels from the feeding roll 13 to the winding roll 14.

A cylindrical can 15 having a diameter larger than that of each of the rolls 13 and 14 is arranged at the middle portion where the non-magnetic support member 1 travels from the feeding roll 13 to the winding roll 14. The cylindrical can 15 is arranged such that the non-magnetic support member 1 is drawn downward in FIG. 2, and is designed to be rotated at a predetermined rate clockwise in FIG. 2. The feeding roll 13, the winding roll 14, and the cylindrical can 15 are respectively constituted by cylindrical shapes each having a length almost equal to the width of the non-magnetic support member 1. A cooling unit (not shown) is arranged inside of the cylindrical can 15, so that the non-magnetic support member 1 can be suppressed from being deformed by an increase in temperature of the non-magnetic support member 1.

The non-magnetic support member 1 is sequentially fed from the feeding roll 13, passes through the peripheral surface of the cylindrical can 15, and is wound on the winding roll 14. Guide rolls 16 and 17 are respectively arranged between the feeding roll 13 and the cylindrical can 15 and between the cylindrical can 15 and the winding roll 14.

In this case, the guide rolls 16 and 17 are used such that the non-magnetic support member 1 smoothly travels. The guide roll 16 applies a predetermined tension to the non-magnetic support member 1 traveling from the feeding roll 13 to the cylindrical can 15. Similarly, the guide roll 17 applies a predetermined tension to the non-magnetic support member 1 traveling from the cylindrical can 15 to the winding roll 14.

In the vacuum chamber 12, a crucible 18 is arranged below the cylindrical can 15, and the crucible 18 is filled with a ferromagnetic metal material 19. The crucible 18 has a width almost equal to the length of the cylindrical can 15.

On the other hand, an electron gun 20 for heating and vaporizing the ferromagnetic metal material 19 in the crucible 18 is attached to the side wall portion of the vacuum chamber 12. The electron gun 20 is arranged at a position where an electron beam X emitted from the electron gun 20 is irradiated onto the ferromagnetic metal material 19 in the crucible 18. The ferromagnetic metal material 19 vaporized by the electron gun 20 is formed on and adhered to the non-magnetic support member 1 traveling at a predetermined rate around the cylindrical can 15 as the magnetic layer 2.

A shutter 21 is arranged between the cylindrical can 15 and the crucible 18 and near the cylindrical can 15. The shutter 21 is formed to cover a predetermined region of the non-magnetic support member 1 traveling at a predetermined rate around the cylindrical can 15. The shutter 21 is formed such that the ferromagnetic metal material 19 vaporized as described above is obliquely deposited on the non-magnetic support member 1 at an angle falling within a predetermined angle range. In addition, in the deposition, an oxygen gas is supplied onto the front surface of the non-magnetic support member 1 in the vacuum chamber 12 through an oxygen gas supply port 22 formed through the side wall portion of the vacuum chamber 12. In this manner, the magnetic characteristics, durability, and weatherability of the magnetic layer 2 to be formed can be improved.

The vacuum deposition is performed in the following manner. More specifically, the vacuum chamber 12 is kept at a degree of vacuum of, e.g., $1 \times 10^{-4}$ Torr, and an oxygen gas is supplied at a rate of, e.g., 250 cc/min from the oxygen gas supply port 22. The incident angle of vaporized metal onto the non-magnetic support member 1 is set within the range of, 45° to 90°. The magnetic layer 2 is formed to have a thickness of, e.g., 200 nm. As the ferromagnetic metal material 19 used as a vaporization source, a ferromagnetic metal containing Co as a main component, e.g., $Co_{80}$—$Ni_{20}$ (numerical values represent compositions by wt %) is used.

The magnetic layer 2 may be formed by an ion-plating method in which the ferromagnetic metal material is vaporized in discharge, a sputtering method in which glow discharge is generated in an atmosphere containing argon as a main component, and atoms on the ferromagnetic metal material surface are knocked on by argon ions generated by the glow discharge, or the like.

A plasma CVD apparatus used in formation of the protective layer 3 and the back-coat layer 4 will be described below.

Figure 3:
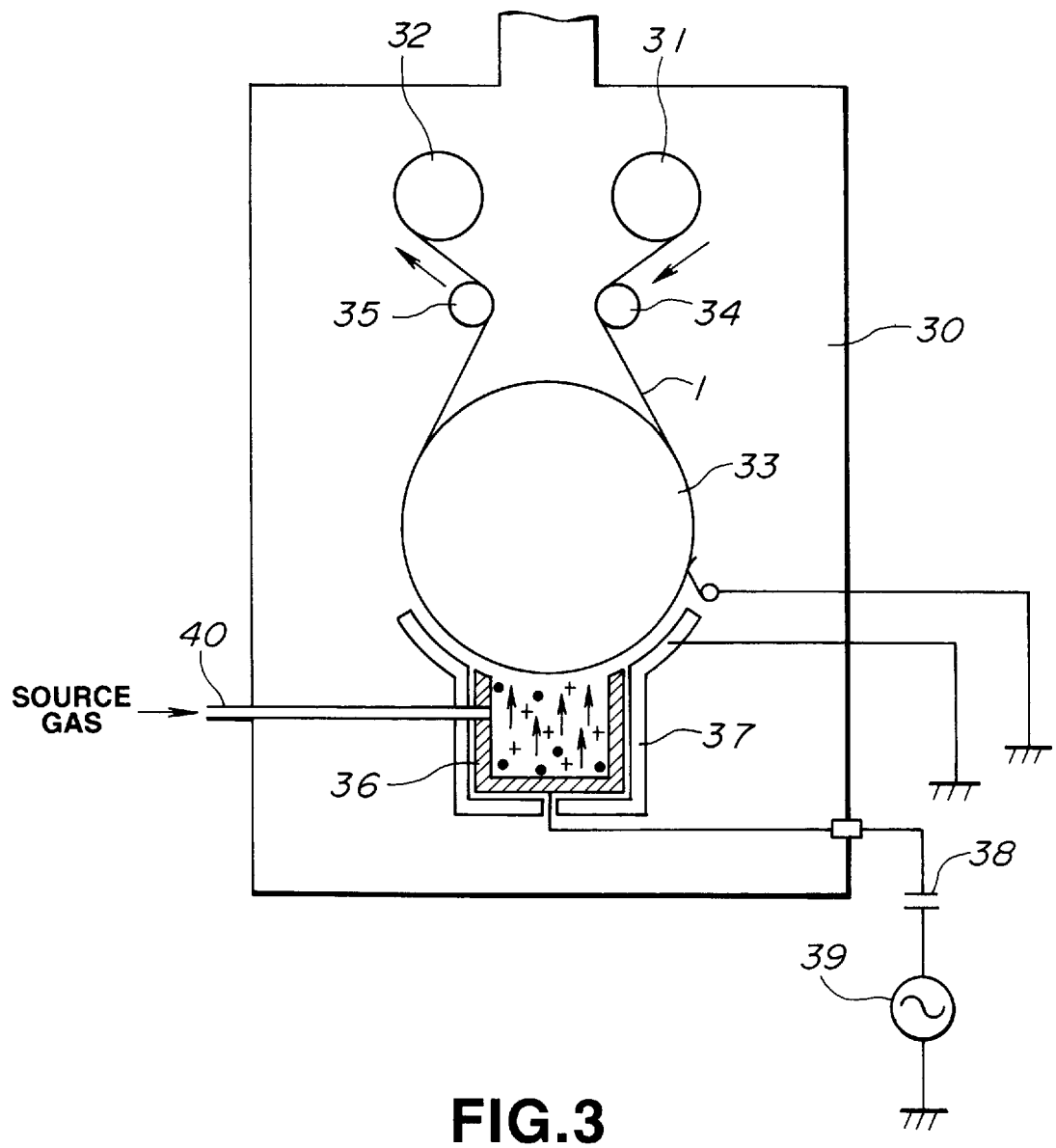
FIG. 3 is a typical view showing an arrangement of a plasma CVD apparatus.

This plasma CVD apparatus is a hollow-anode type plasma CVD apparatus. As shown in FIG. 3, in a vacuum chamber 30 kept at a degree of vacuum of about $10^{-2}$ to $10^{-3}$ Pa, the tape-like non-magnetic support member 1 serving as an object to be processed sequentially travels from a feeding roll 31 rotated at a predetermined rate clockwise in FIG. 3 and a winding roll 32 rotated at a predetermined rate clockwise in FIG. 3.

A cylindrical can 33 having a diameter larger than that of each of the rolls 31 and 32 is arranged at the middle portion where the non-magnetic support member 1 travels from the feeding roll 31 to the winding roll 32 to draw the non-magnetic support member 1 downward in FIG. 3. The cylindrical can 33 are rotated at a predetermined rate clockwise in FIG. 3.

The feeding roll 31, the winding roll 32, and the cylindrical can 33 are respectively constituted by cylindrical shapes each having a length almost equal to the width of the non-magnetic support member 1. A cooling unit (not shown) is arranged inside of the cylindrical can 33, so that the non-magnetic support member 1 can be suppressed from being deformed by an increase in temperature of the non-magnetic support member 1.

The non-magnetic support member 1 is sequentially fed from the feeding roll 31, passes through the peripheral surface of the cylindrical can 33, and is wound on the winding roll 32. In this case, guide rolls 34 and 35 are respectively arranged between the feeding roll 31 and the cylindrical can 33 and between the cylindrical can 33 and the winding roll 32.

These guide rolls 34 and 35 are used such that the non-magnetic support member 1 smoothly travels. The guide roll 34 applies a predetermined tension to the non-magnetic support member 1 traveling from the feeding roll 31 to the cylindrical can 33. Similarly, the guide roll 35 applies a predetermined tension to the non-magnetic support member 1 traveling from the cylindrical can 33 to the winding roll 32.

A pair of electrodes 36 and 37 are arranged below the cylindrical can 33 in the vacuum chamber 30. The electrodes 36 and 37 respectively constitute boxes (hollows) each having an almost rectangular section. An electrode arranged opposite to the cylindrical can 33 serves as the anode electrode 36, and an electrode arranged to surround the anode electrode 36 through an insulator serves as the cathode electrode 37. In this case, the cathode electrode 37 is grounded, and has an upper end portion which is opened along the peripheral surface of the cylindrical can 33.

The anode electrode 36 is connected to an AC power supply 39 arranged outside the vacuum chamber 30 through a capacitor 38. A source gas supply tube 40 arranged through the outside wall of the vacuum chamber 30 is attached to the anode electrode 36. The source gas supply tube 40 is hollow, and source gases such as an ethylene gas or a hydrogen gas are supplied through the source gas supply tube 40.

In film formation, a predetermined voltage is applied from the AC power supply 39 to the anode electrode 36 to generate discharge between the cylindrical can 33 and the anode electrode 36, and the source gases are supplied into the space between the anode electrode 36 and the cylindrical can 33 through the source gas supply tube 40. At this time, the pressure of the space between the anode electrode 36 and the cylindrical can 33 is set to be high, i.e., about 80 Pa.

Chemical reactions such as decomposition, synthesis, and the like of the source gases are caused by a plasma generated by the above discharge. As a result, film formation is performed on the non-magnetic support member 1 passing through the space between the anode electrode 36 and the cylindrical can 33.

In this film formation, about 60 to 85% of argon gas is mixed in the source gases. For this reason, stable discharge can be generated, RF power can be increased, and a self-bias voltage applied across the electrodes 36 and 37 can be increased. When the mixing rate of the argon gas is increased while the RF power is kept constant, the self-bias voltage can also be increased. When the self-bias voltage is increased, a film having high hardness can be formed, and the durability and traveling properties of the manufactured magnetic tape can be improved.

The protective layer and the back-coat layer formed by the above plasma CVD apparatus are not easily peeled because the layers have strong adhering forces, and can be used as a preferable protective layer and a preferable back-coat layer, respectively. In addition, the method of forming a protective layer or a back-coat layer using the above plasma CVD apparatus has a film forming rate which is not lower than that of a method of coating a back-coat layer material or a protective layer material on a film and drying it to form a back-coat layer or a protective layer. For this reason, high productivity can be obtained.

Magnetic tapes on which protective layers and back-coat layers were formed using the above plasma CVD apparatus were manufactured while the film formation conditions of the protective layers and the back-coat layers were changed, and the characteristics of the magnetic tapes were evaluated.

In order to examine an influence of the hydrogen content of a protective layer on the characteristics of a magnetic tape, a protective layer was formed by using the above plasma CVD apparatus under the film formation conditions shown in Table 1, samples 1 to 5 in which the hydrogen contents of the protective layers are different from each other were manufactured.

TABLE 1

| | INPUT POWER [W] | PROTECTIVE LAYER THICKNESS [nm] | SOURCE GAS ETHYLENE/ HYDROGEN [SCCM/SCCM] | DEGREE OF VACUUM [Pa] |
|---|---|---|---|---|
| SAMPLE 1 | | | 200/0 | 60 |
| SAMPLE 2 | | | 200/50 | 60 |
| SAMPLE 3 | 800 | 15 | 200/100 | 60 |
| SAMPLE 4 | | | 200/0 | 100 |
| SAMPLE 5 | | | 5/250 | 60 |

The hydrogen contents of the protective layer formed under the film formation conditions shown in Table 1 were measured.

In this case, in measurement of the hydrogen content, film formation was performed under the same condition as that of Sample 3, and the ratio of hydrogen to oxygen was measured using a combustion method. More specifically, a carbon powder was made of the film formed under the same condition as that of Sample 3, and the carbon powder was sufficiently dried. Thereafter, the weights of $CO_2$ and $H_2O$ generated when the carbon powder was burned were measured, and ($CO_2$ weight/44):($H_2O$ weight×2/18) was calculated. As a result, a ratio of 94:5 was obtained, and it was understood that the hydrogen content was about 5 atom % under the condition of Sample 3.

Figure 4:
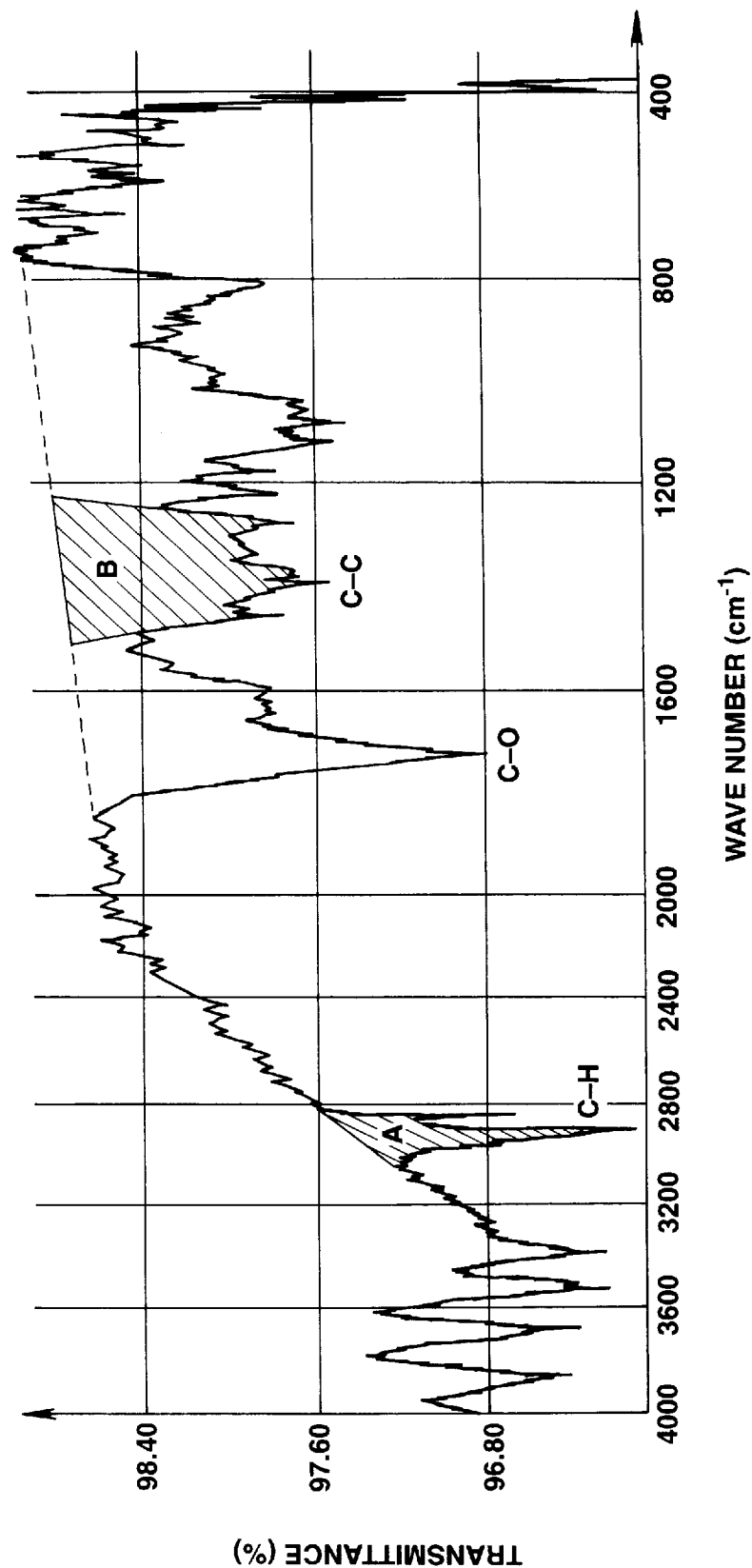
FIG. 4 is a graph showing a result obtained by measuring the FT—IR spectrum of a protective layer.

A film having a thickness of 50 nm was formed under the same condition as that of Sample 3, and the Fourier-transform infrared ray (FT-IR) spectrum of the film was measured by a transmission-type FT-IR spectrum measurement apparatus. The obtained result is shown in FIG. 4. At this time, when the ratio of absorption by C—H bonds near a wave number of 2,890 $cm^{-1}$ and absorption by C—C bonds near a wave number of 1,500 $cm^{-1}$ i,e., the ratio of the area of a portion indicated by a hatched portion A in FIG. 4 and the area of a portion indicated by a hatched portion B in FIG. 4, was calculated, a ratio of about 1:5 could be obtained.

As is apparent from these results, when the ratio of C—H bonds and C—C bonds was 1:5, the hydrogen content was about 5 atom %. Therefore, with respect to the protective layers except the protective layer of Sample 3, the FT-IR spectra were measured to calculate the ratios of C—H bonds to C—C bonds, and hydrogen components were calculated by a proportional distribution method.

In order to examine the relationship between the hydrogen content measured as described above and the effect of the protective layer, periods of durability time of the magnetic tapes on which the protective layers were formed under the film formation conditions shown in Table 1 when a reproducing operation by a VTR is temporarily stopped, i.e., periods of still durability time, were measured.

In this case, a recorder obtained by modifying a video tape recorder (CVD-1000: trade name of Sony Corp.) was used in the measurement. The modification was performed as described below. That is, an algorithm for canceling a still function for eight minutes was removed, the still operation was continued until the stop operation was instructed, and a quartz oscillator having a frequency of 7.6 MHz was attached immediately before a recording amplifier. In this manner, the recorder was designed such that a single sine wave could be input.

Table 2 shows the results obtained by measuring the hydrogen contents of the protective layers of the respective samples and the results obtained by measuring the still durabilities of the magnetic tapes.

TABLE 2

| | HYDROGEN CONTENT [atom %] | STILL DURABILITY |
|---|---|---|
| SAMPLE 1 | 20 | 24 hours or longer |
| SAMPLE 2 | 15 | 24 hours or longer |
| SAMPLE 3 | 5 | 24 hours or longer |
| SAMPLE 4 | 25 | 15 hours |
| SAMPLE 5 | 3 | 6 hours |

As is apparent from the results shown in Table 2, the durability of the magnetic tape is excellent when the hydrogen content was 5 to 20 atom %. More specifically, when a protective layer containing carbon as a main component and 5 to 20 atom % of hydrogen is formed on a magnetic layer, the durability of the magnetic tape can be improved.

In order to examine an influence of the hydrogen content of a back-coat layer on the characteristics of a magnetic tape, back-coat layers were formed on the rear surfaces of non-magnetic support members under the film formation conditions shown in Table 3 to manufacture Samples 6 to 10 in which the hydrogen contents of the back-coat layers were different from each other.

TABLE 3

| | INPUT POWER [W] | SOURCE GAS ETHYLENE/ HYDROGEN | DEGREE OF VACUUM [Pa] |
|---|---|---|---|
| SAMPLE 6 | | 200/0 | 60 |
| SAMPLE 7 | | 200/50 | 60 |
| SAMPLE 8 | 800 | 200/100 | 60 |
| SAMPLE 9 | | 200/0 | 100 |
| SAMPLE 10 | | 200/250 | 60 |

As in measurement of the hydrogen content of the protective layers described above, the hydrogen contents of the back-coat layers of the respective samples shown in Table 3 were measured. In order to examine the relationship between the hydrogen content of the back-coat layer and the effect of the back-coat layer, level-down amounts of the respective samples obtained when a recorded signal was repetitively reproduced were measured.

At this time, measurement of the level-down amount was performed in the following manner. That is, a sine wave having a frequency of 7.6 MHz was input to a still track once to perform a recording operation, and outputs were sequentially detected. The degree of attenuation of the output due to the influence of a clog or the like was calculated in such a manner that the first output was compared with the output obtained after shuttling was performed 100 times, and the rate of the attenuation was defined as a level-down amount.

Table 4 shows the results obtained by measuring the hydrogen contents of the back-coat layers of the respective samples and the results obtained by measuring the level-down amounts.

TABLE 4

| | HYDROGEN CONTENT [atom %] | LEVEL-DOWN AMOUNT |
|---|---|---|
| SAMPLE 6 | 20 | −0.5db |
| SAMPLE 7 | 15 | −0.5db |
| SAMPLE 8 | 5 | −1.0db |
| SAMPLE 9 | 25 | −6.0db |
| SAMPLE 10 | 3 | −5.0db |

As is apparent from the results shown in Table 4, the level-down amount is preferably small when the hydrogen content is 5 to 20 atom %. More specifically, a back-coat layer containing when a protective layer containing carbon as a main component and 5 to 20 atom % of hydrogen is formed on the rear surface of a non-magnetic member, the characteristics of the magnetic tape can be improved.

In order to examine an influence of the thickness of a back-coat layer on the characteristics of a magnetic tape, as shown in Table 5, Samples 11 to 17 in which the thicknesses of back-coat layers were different from each other. In Samples 11 to 17, the protective layers were formed under the same condition as that of Sample 2. The back-coat layers were formed under the same condition as that of Sample 7 except that the thicknesses of the back-coat layers are different from each other. More specifically, in Samples 11 to 17, the thickness of each of all the protective layers is 15 nm, and the hydrogen content of each of all the back-coat layers and each of the protective layers are 15 atom %.

In manufacture of Samples 11 to 17, the thicknesses of the back-coat layers were controlled by changing a feeding rate of the non-magnetic support member in formation of the back-coat layers. More specifically, when the thickness of the back-coat layer was decreased, film formation was performed such that the feeding rate of the non-magnetic member from the feeding roll to the winding roll was increased. When the thickness of the back-coat layer was increased, film formation was performed such that the feeding rate of the non-magnetic member from the feeding roll to the winding roll was lowered.

TABLE 5

| | THICKNESS OF BACK-COAT LAYER | PROTECTIVE LAYER THICKNESS | HYDROGEN CONTENT [atom %] |
|---|---|---|---|
| SAMPLE 11 | 3 | | |
| SAMPLE 12 | 5 | | |
| SAMPLE 13 | 20 | 15 | 15 |
| SAMPLE 14 | 70 | | |
| SAMPLE 15 | 100 | | |
| SAMPLE 16 | 500 | | |
| SAMPLE 17 | 600 | | |

The surface properties of the protective layer and back-coat layer of each sample shown in Table 5 were examined. In this case, evaluation of the surface properties was performed in the following manner. More specifically, by using a SUS303, friction coefficients at a temperature of 40° C. and a humidity of 80% were measured on the front surface on which the protective layer was formed and on the rear surface on which the back-coat layer was formed. Evaluation of the surface properties of a magnetic tape manufactured without forming a back-coat layer as Sample A was performed for comparison. Measurement results are shown in Table 6.

TABLE 6

| | FRICTION COEFFICIENT OF FRONT SURFACE | FRICTION COEFFICIENT OS REAR SURFACE | THICKNESS OF BACK-COAT LAYER [nm] |
|---|---|---|---|
| SAMPLE 11 | 0.23 | 0.29 | 3 |
| SAMPLE 12 | 0.23 | 0.22 | 5 |
| SAMPLE 13 | 0.23 | 0.21 | 20 |
| SAMPLE 14 | 0.23 | 0.21 | 70 |
| SAMPLE 15 | 0.23 | 0.21 | 100 |
| SAMPLE 16 | 0.23 | 0.21 | 500 |
| SAMPLE 17 | 0.23 | IMPOSSIBLE MEASUREMENT | 600 |
| SAMPLE A | IMPOSSIBLE MEASUREMENT | IMPOSSIBLE MEASUREMENT | 0 |

In this case, since film peeling occurred on the rear surface of Sample 17 when the friction coefficient was measured, the friction coefficient could not be measured. Since sticking occurred on Sample A when the friction coefficient was measured, the friction coefficient could not be measured.

As is apparent from the results shown in Table 6, the magnetic tapes of Samples 11 to 17 have small friction coefficients, have excellent traveling properties. In this case, although it is generally said that the friction coefficient of the magnetic tape is especially preferably set to be 0.25 or less, the friction coefficients in Samples 12 to 16 are smaller then this value. It is understood that the magnetic tapes of Samples 12 to 16 are specially preferable. Therefore, the thickness of the back-coat layer is specially preferably set within the range of 5 to 500 nm.

Magnetic tapes were manufactured while the thicknesses of the protective layers were different from each other, and still durabilities were measured in the same manner as in the above measurement. At this time, the same formation conditions as the formation conditions of the protective layer and the back-coat layer of Sample 16 were used except for the thickness of the protective layer. A magnetic tape manufactured without a protective layer was set as Sample B. With reference to an output obtained when the magnetic tape of Sample B, the output levels of other magnetic tapes were measured. Measurement results are shown in Table 7.

TABLE 7

|  | PROTECTIVE LAYER THICKNESS [nm] | STILL DURABILITY | OUTPUT LEVEL |
|---|---|---|---|
| SAMPLE B | 0 | 2 hours | reference value (0db) |
| SAMPLE 18 | 1.4 | 15 hours | −0.2db |
| SAMPLE 19 | 2 | 24 hours or longer | −0.3db |
| SAMPLE 20 | 5 | 24 hours or longer | −0.7db |
| SAMPLE 21 | 10 | 24 hours or longer | −1.4db |
| SAMPLE 22 | 20 | 24 hours or longer | −2.8db |
| SAMPLE 23 | 30 | 24 hours or longer | −4.2db |

As is apparent from the results shown in Table 7, the durability of the magnetic tape is excellent when the protective layer has a thickness of 2 nm or more. However, when the thickness of the protective layer is excessively large, an output attenuates. More specifically, as shown in Table 7, when the thickness of the protective layer exceeds 20 nm, the output attenuates by 3 dB or more. Therefore, in consideration of the relationship between durability and high output, the thickness of the protective layer is preferably set within the range of 2 to 20 nm.

In the magnetic recording medium according to the present invention, a fluorine-based lubricant may be coated on at least one of the protective layer and the back-coat layer.

After the protective layer and the back-coat layer are formed as described above, perfluoropolyether (trade name: Fonbline Z-DOL) is coated as a fluorine-based lubricant on each of the protective layer and the back-coat layer to have a thickness of about 2 nm. As a result, the friction coefficient of the protective layer and the back-coat layer decreased, and the sliding characteristics of the magnetic tape were further improved.

The material of the magnetic layer of the magnetic recording medium according to the present invention is not limited to the above example, and any material which is used in a general deposition-type magnetic recording medium can be used. More specifically, for example, a ferromagnetic metal such as Fe, Co, or Ni or a ferromagnetic alloy such as Fe—Co, Co—Ni, Fe—Co—Ni, Fe—Cu, Co—Cu, Co—Au, Co—Pt, Mn—Bi, Mn—Al, Fe—Cr, Co—Cr, Ni—Cr, Fe—Co—Cr, Co—Ni—Cr, or Fe—Co—Ni—Cr can be used.

A magnetic layer consisting of such a ferromagnetic metal material may have a single-layer structure or a multi-layer structure. When the magnetic layer is constituted by a multi-layer structure, an intermediate layer may be formed between respective layers to improve the adhering force between the respective layers and to control an antimagnetic force.

INDUSTRIAL APPLICABILITY

As is apparent from the above description, a magnetic recording medium according the present invention has very excellent characteristics, preferable traveling properties, and high durability.

When a protective layer and a back-coat layer are formed by a plasma CVD method, a protective layer and a back-coat layer each having a strong adhering force and preferable characteristics can be formed.

In addition, according to the plasma CVD method, a film forming rate is high. For this reason, when a protective layer or a back-coat layer is formed by the plasma CVD method, productivity can be improved.

I claim:

1. A magnetic recording medium comprising:

a non-metallic support member having front and rear sides, the front side being covered by a ferromagnetic metal thin film, the ferromagnetic metal thin film being containing Co covered by a protective layer having a thickness ranging from about 2 nm to about 20 nm, the back side being covered by a back coat layer having a thickness ranging from about 5 nm to about 500 nm, the protective layer comprising hydrogen in an amount ranging from about 5 atom % to about 20 atom % and carbon, the protective layer being substantially free of any binder, the back coat layer comprising hydrogen in an amount ranging from about 5 atom % to about 20 atom % and carbon, the back coat layer being substantially free of any binder, the protective layer and the back coat layer being coated with a fluorine based lubricant selected from the group consisting of perfluoropolyether, an ester of a carbonic acid and perfluoropolyether, an ester of perfluoroalkylcarboxylate, perfluoroalkylester carboxylate, perfluoroalkylester perfluoroalkylcarboxylate, perfluoroalkylamide carboxylate and, perfluoroalkylamide perfluoroalkylcarboxylate.

2. The magnetic recording medium of claim 1 wherein the hydrogen concentration of the protective layer is approximately equal to the hydrogen concentration of the back coat layer.

* * * * *